Nov. 10, 1959     H. H. HEMPE     2,912,019
ADJUSTABLE MITER BOX
Filed May 19, 1955     3 Sheets-Sheet 2
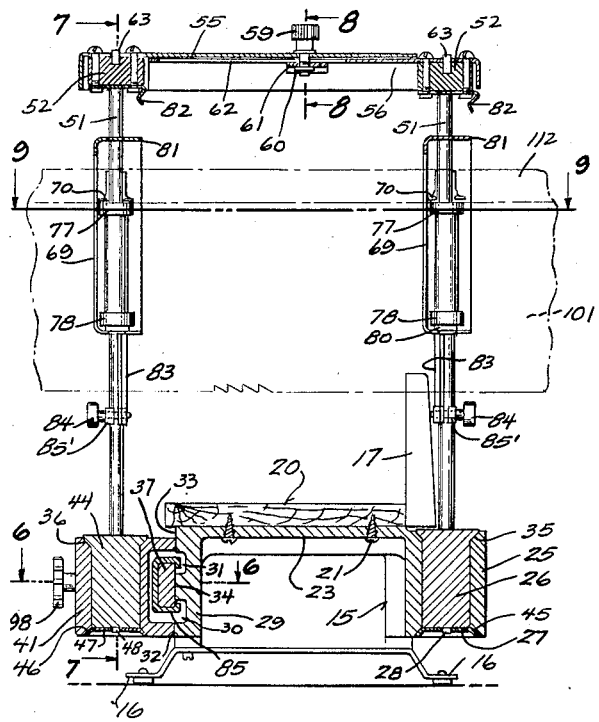
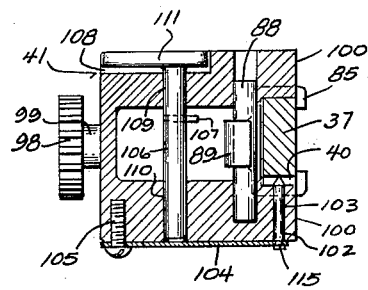
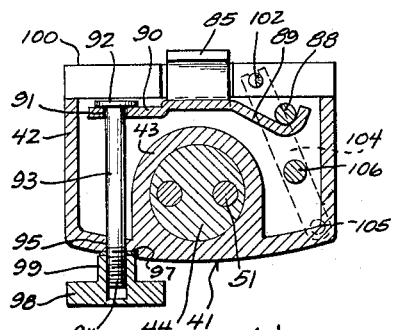
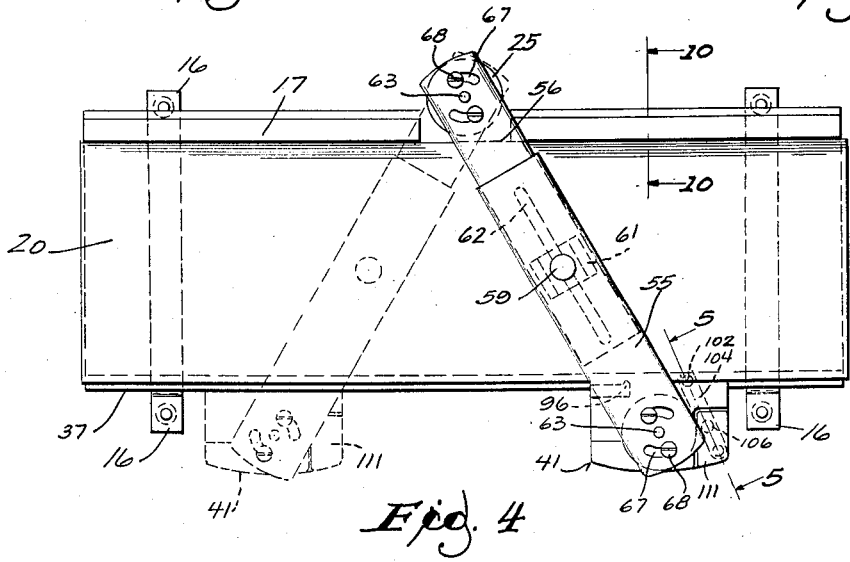
INVENTOR.
HAROLD H. HEMPE
BY
Wheeler, Wheeler + Wheeler
ATTORNEYS

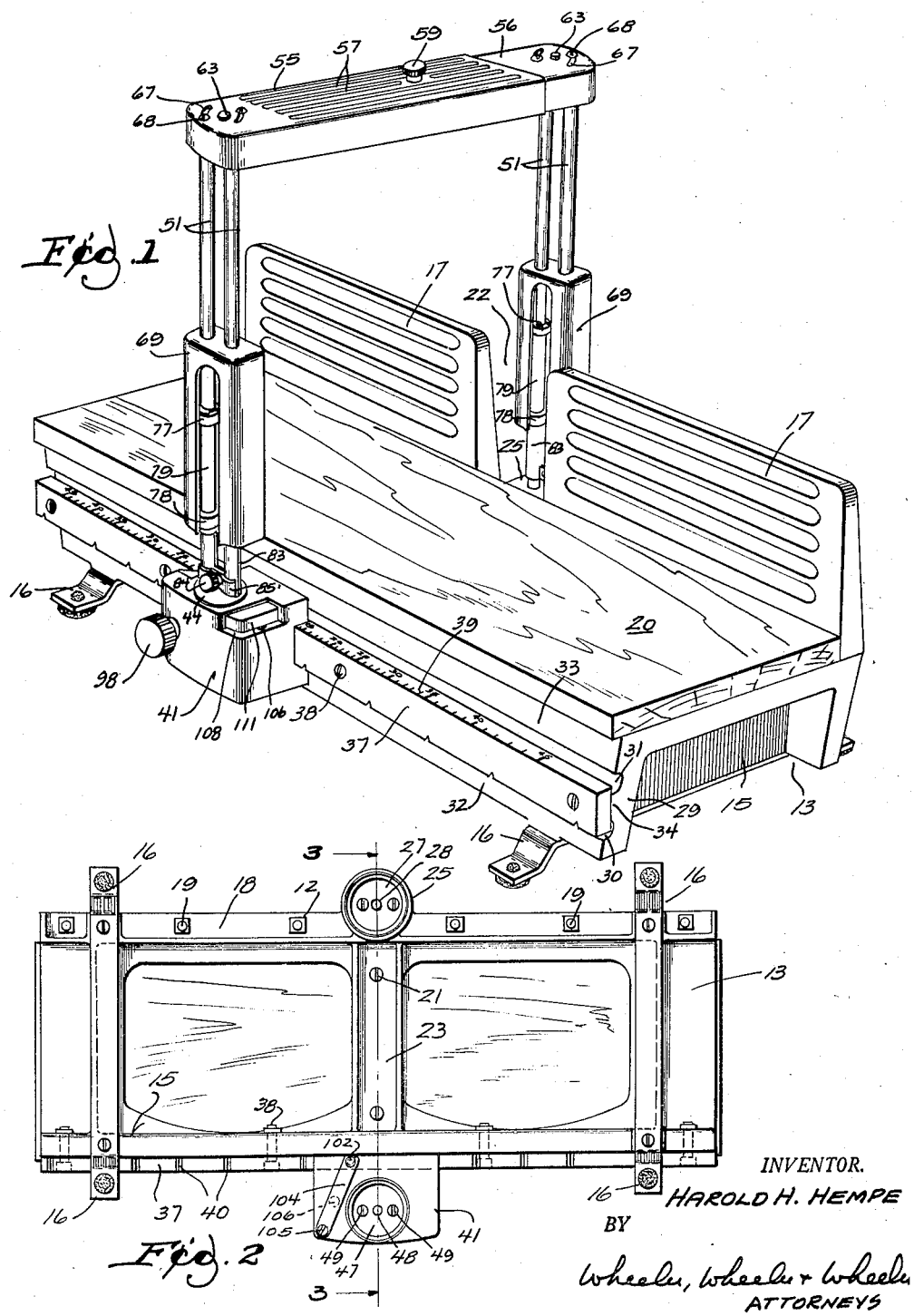

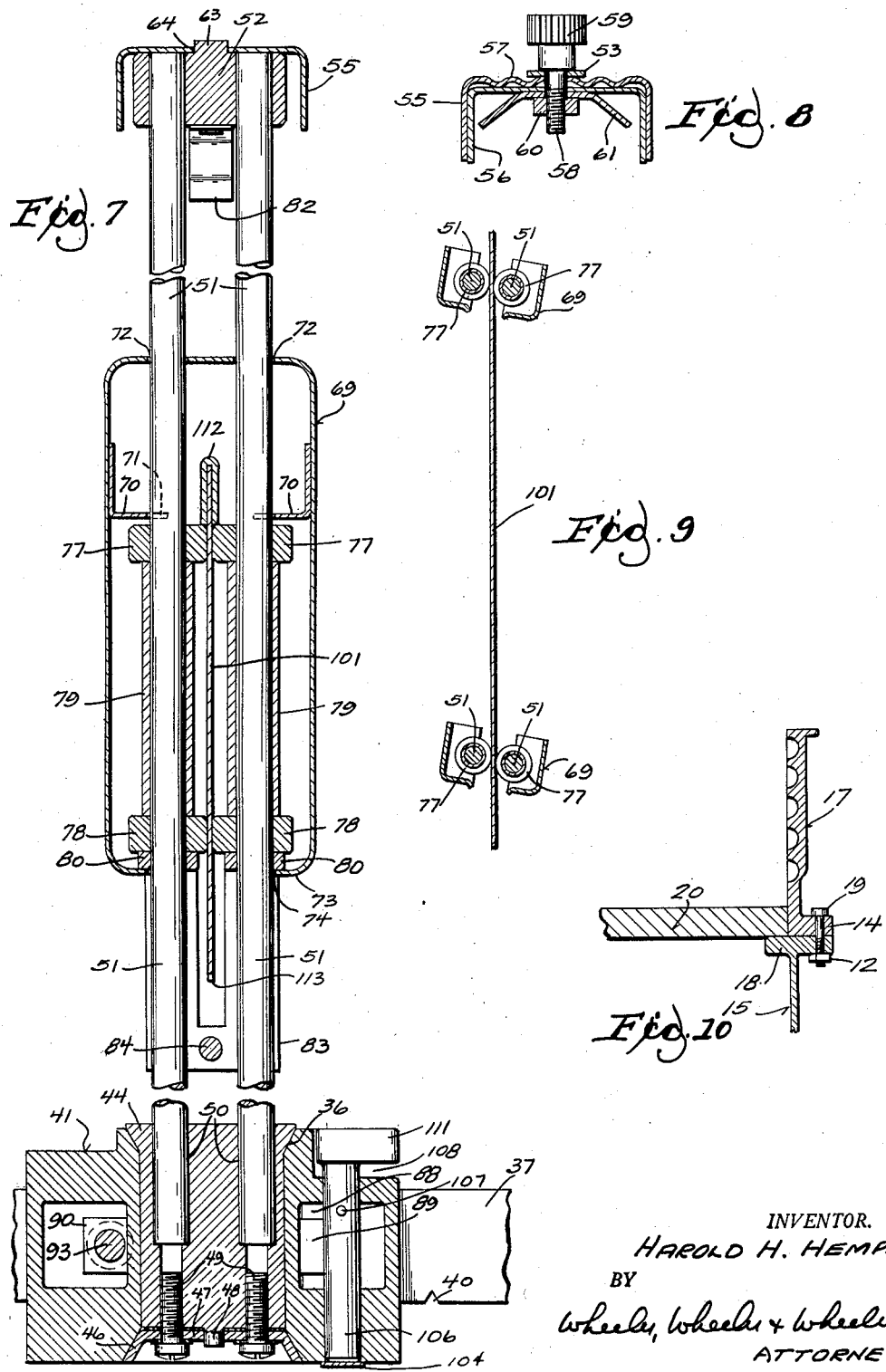

United States Patent Office 2,912,019
Patented Nov. 10, 1959

2,912,019

ADJUSTABLE MITER BOX

Harold H. Hempe, Milwaukee, Wis.

Application May 19, 1955, Serial No. 509,544

6 Claims. (Cl. 143—89)

This invention relates to an improved miter box.

An important feature of my improved miter box resides in its novel saw guides which are adjustable to receive saws of different thickness and to guide such saws with accuracy. The novel saw guides permit setting up the device with the saw guides spaced to easily receive the saw, the guides then being adjusted to a close tolerance with respect to the saw blade for accurate guiding thereof in subsequent saw operations.

My saw guide assemblies desirably provide vertically adjustable support means for the saw and suspend the saw above the level of the work while setting up the work. The saw guides may then be released from elevated position to permit descent of the saw against the work. I also provide a depth stop which may be set to limit the depth of the cut made by the saw in the work and with respect to the work table.

Another important feature of my invention resides in the novel means for adjusting one saw guide assembly with respect to the other saw guide assembly whereby the saw will be accurately and positively held at the proper angle with respect to the work. The miter box base is provided with a milled surface against which an adjustable saw guide support bracket is clamped in selective set positions thereof, means being provided to expeditiously release the clamp for movement of the bracket to another position.

Other features and advantages of the device of my invention will appear upon an examination of the following disclosure.

In the drawings:

Fig. 1 is a perspective view of a miter box embodying my invention.

Fig. 2 is an inverted plan view of the miter box of Fig. 1.

Fig. 3 is a vertical cross section taken along the line 3—3 of Fig. 2.

Fig. 4 is a plan view of the device of Fig. 1, one position of the bodily movable adjustable saw guide assembly being illustrated in full lines and another position being illustrated in dot-dash lines.

Fig. 5 is a fragmentary cross sectional view taken along the line 6—6 of Fig. 3.

Fig. 6 is a cross sectional view taken along the line 6—6 of Fig. 3.

Fig. 7 is a vertical cross section taken along the line 7—7 of Fig. 3.

Fig. 8 is a cross section taken along the line 8—8 of Fig. 3.

Fig. 9 is a cross section taken along the line 9—9 of Fig. 3.

Fig. 10 is a cross section taken along the line 10—10 of Fig. 4.

As best shown in the perspective view of Fig. 1, the miter box comprises a metal base frame 15 having feet 16 on which the miter box is supported on a flat surface. Squaring fence 17 is mounted on member 18 of frame 15 (see Fig. 10) by a series of bolts 19 and nuts 12 which respectively engage flange 14 of the fence 17 and frame element 18. Mounted at a right angle to the squaring fence 17 is a work table comprising a cutting or baseboard 20 secured by screws 21 to channel-shaped cross member 23 of the frame as shown in Figs. 2 and 3. The frame 15 is relieved at both ends at 13 to receive a C-clamp for clamping a workpiece to the cutting board.

The squaring fence 17 is desirably made in two sections which are spaced apart as shown at 22 in Fig. 1. In substantial alignment with the space 22 and below the level of cutting board 20 the frame is provided with a rearwardly projecting cup-shaped projection 25 which provides a bearing socket for a rotary plug 26 on which the rearmost guide is supported. As shown in Figs. 2 and 3 the otherwise open bottom of the socket is closed by a bottom closure 27 having a central aperture which receives a pin 28 formed on the axis of rotation of plug 25.

The front member 29 of the miter box base frame 15 is longitudinally grooved at 30 and 31. Surfaces 32, 33 of the member 29 are milled to the same plane to provide a flat bearing surface for the support bracket 41 as hereinafter explained. To a rib 34 between the grooves 30, 31, I attach a longitudinal extending rail 37 by means of the screws 38. The top edge of rail 37 is provided with a scale 39 to indicate miter angle. The bottom edge of the rail 37 is provided with spaced notches 40 to selectively receive a detent on the forward guide assembly support bracket as hereinafter explained.

Slidably mounted on the rail 37 is a forward guide assembly support bracket indicated generally by reference character 41. The support bracket comprises a skirt or housing wall 42 as shown in Fig. 6 and an internal socket cup 43 which provides a bearing for a rotatable plug 44 of substantially identical construction to the plug 26 aforedescribed. As best shown in Figs. 3 and 7, the otherwise open bottom of the well cup 43 is closed by closure 47 having a central opening in which the pin 48 of plug 44 seats. Plugs 26, 44 are substantially identical and are provided with bores to receive bolts 49, the plugs also being provided with counterbores 50 to receive the lower ends of parallel guide roller rods 51.

The upper ends of plugs 26, 44 are flared at 35, 36 respectively, the closures 27, 47 also being flared peripherally at 45, 46. Accordingly, when bolts 49 are tightened, the plugs 26, 44 are axially locked in position. Removal of bolts 49 permits dis-assembly of the bottom closures 27, 47 from the plugs.

The upper ends of the guide roller rods 51 of each saw guide assembly are mounted in caps 52, the respective caps being cross connected by an extensible arm comprising channel-shaped telescopic members 55, 56. External telescopic member 55 may be provided with surface grooves 57. The members 55, 56 will slide as the distance between the saw guide assemblies is changed whenever support bracket 21 is moved along rail 37, but may be clamped in adjustable relationship by means of the clamping screw 58 which has a knob 59. The knob 59 bears on a top washer 53 engaged with the upper surface of member 55. Screw 58 reacts against a nut 60 which is welded to a channel-shaped bearing plate 61 which substantially completely spans the width of channel member 56 to preclude turning of the nut with the screw. Bearing plate 61 also serves as a washer engaged with the undersurface of member 56. Inner telescopic channel member 56 is provided with a longitudinal slot 62 (Fig. 3) through which the screw 58 extends and to permit relative movement of the members 55, 56.

The respective caps 52 are provided with central pivot pins 63 which engage journal openings 64 in the respective channel members 55, 56. Pivot pins 63 are aligned with the axes of rotation of rotary plugs 44, 26. Accordingly, the saw guide assemblies may be rotated on axes defined by the pins 63 and 28, 48.

As best shown in Figs. 1 and 4, the respective extensible arm members 55, 56 are provided with curvilinear slots 67 centered on the pivot pins 63, the respective caps 52 being provided with headed bolts 68 which extend through the slots 67 and which may be tightened against the margins of the slots to clamp the caps 52 against its extension arm. When the bolts are loosened the respective saw guide assemblies, comprising caps 52, rods 51 and plugs 26, 44, may be freely rotated as limited only by the engagement of the bolts 68 against the ends of curvilinear slots 67.

The paired rods 51 of each saw guide assembly are provided with a guide roller carrier comprising a hood 69 through which the rods 51 pass. The hood is internally provided with a pair of partition brackets 70 which are cut out at 71 about the rods 51 and serve to space the rollers 77 from the top of the hood. The tops of the respective hoods are also apertured at 72 to pass the rods 51. The bottoms 73 of the hoods 69 are likewise cut out at 74 for passage of the rods 51.

Between partition brackets 70 and bottom wall 73 the rods 51 are provided with upper and lower sets of saw guide rollers 77 and 78, the respective sets of rollers being axially separated by tubular spacer members 79. The bottom set of rollers 78 may be spaced from wall 73 by tubular spacers 80. The respective rollers and spacers are journaled for rotation on the rods 51 and are free to move axially thereon under pressure of the hood 69 as the hood is manually manipulated in an axial direction. Accordingly, the partitions 70 and walls 73 transmit motion from the hood to the rollers which are confined therebetween. The respective hoods 69 may be lifted to an uppermost position in which the edges 81 of the top walls of the hoods engage spring clips 82 mounted on the undersurface of caps 51 (see Fig. 3).

The lowermost position of the respective hoods 69 may be defined by depth stops 83 which comprise double arm stampings axially shiftable on the rods 51 and clamped thereto by means of the screws 84 which tighten clamp plates 85' against the rods 51. The upper ends of the legs of the stampings 83 engage the bottom wall 73 of the respective hoods 69. The depth stop is used in the process of setting up the saw as hereinafter explained.

The adjustable support bracket 41 for the forward saw guide assembly may be adjustably clamped in position along rail 37 by means of the C-shaped hook 85 best shown in Figs. 3, 5 and 6. A fulcrum pin 88 is disposed vertically within the support bracket 41 and provides a fulcrum point against which one arm 89 of the C-shaped hook 85 pivots. Arm 89 is extended at 90 beyond the C-shaped hook 85 and is provided with an aperture 91. Tension stem 93 extends through aperture 91 and has an enlarged head 92 engaged with the arm 70. Stem 93 has a threaded end 94 extending through an aperture 95 in the front wall of the bracket 41. Clamping knob 98 has a threaded hub 99 engaged with the threads 94 on the stem 93, and has a shoulder seated in recess 97 formed in the bracket wall.

Accordingly, when the knob 98 is turned in a tightening direction, it draws the stem toward it, the C-shaped hook 85 reacting against the rail 37 to force the clamping surfaces 100 of the bracket against the milled surfaces 32, 33 of the miter box frame. When knob 98 is rotated in the opposite direction, tension on stem 93 is relieved to release the pressure of hook 85 against the rail, thereby permitting the bracket 41 to be shifted longitudinally with respect to the rail 37. In this manner bracket 41 may be adjusted with respect to the graduations of scale 39 on the top edge of the rail to position a saw 101 for any desired cutting angle.

The notches 40 in the bottom edge of the rail 37 define the most common cutting angles. The bracket 41 is provided with a detent to impositively lock the support bracket in predetermined selected positions. The detent comprises a pin 102 axially slidable in a bore 103 in the bracket between positions of engagement and non-engagement with the notches 40. The bottom end of the pin 102 is coupled at 115 to a leaf spring 104 which is connected by means of the screw 105 at its remote end with the bracket 41. The leaf spring biases pin 102 against the lower edge of the rail 37 so that pin 102 will drop into a notch 40 whenever aligned therewith. To release the pin from engagement with a particular notch, I provide a plunger 106 axially slidable in bores 109, 110 formed in the top and bottom walls of the bracket. The plunger 106 has an enlarged head 111 disposed in a recess 108 formed in the corner of the bracket 41. Plunger 106 has a pin 107 which precludes inadvertent removal of the plunger from its position aforesaid. On depression of the head 111, the stem 106 forces the spring 104 downwardly against its bias to release the pin 102 from the notch 40. Release of pressure on the stem head 111 permits the bias of spring 104 to restore pin 102 to pressure contact with the bottom edge of the rail 37 and in condition for entering a notch 40 when aligned therewith.

Accordingly, the bracket may be rectilinearly adjusted on the rail to alignment of its pointer 96 with a desired graduation on the scale 39 and locked in position by tightening the knob 98. If the desired cutting angle is one of those for which a notch 40 is provided, the pin 102 will engage the notch to assist in the accurate and positive positioning of the bracket. When the support bracket 41 is clamped against the rail 37 to firmly press the bracket surfaces 100 against the milled edges 32, 33 on the miter box base frame the respective saw guides will be positively located to guide the saw at the selected cutting angle.

While any saw may be used in my miter box, it is primarily designed for use with a saw 101 having a back 112 as shown in Figs. 3 and 7. A back saw is somewhat stiffer than an ordinary saw and is particularly suited to miter box use. Commercially available back saws, however, may differ in the thickness of their blades 101. One of the principal advantages of the device of the present invention is that the saw guide rollers 77, 78 are adjustable to a close fit with the saw blade 101, regardless of its thickness.

The miter box and saw are initially "set up" by first positioning the saw guide assemblies for the widest spacing of the opposed saw guide rollers 77, 78. The saw is inserted with its back 112 above the level of the top set of rollers 77. The back 112 rests on the top faces of the rollers 77 and is supported thereby. The depth stops 83 are set so that the cutting edge 113 of the saw blade 101 is held about one-half inch above the level of the cutting board 20. The depth stops 83, of course, define the level of the rollers 77 which in turn support the saw from its back 112. The position of the depth stops 83 is fixed by tightening the screws 84. With the saw thus positioned the screws 68 which clamp the top caps 52 of the saw guide assemblies to the extensible arms 55, 56 are loosened.

The respective saw guide assemblies are thereupon rotated until the rollers 77, 78 lightly engage the faces of the saw blade as shown in Fig. 9. To facilitate determining the optimum adjustment of the rotatable saw guide assemblies, a sheet of newspaper may be inserted between one face of the saw blade and the rollers. The saw guide assembly is then rotated to bring the rollers into firm bearing contact with the blade and intervening sheet of newspaper. When the newspaper sheet is removed the clearance between the blade and rollers is just adequate to insure that the saw will glide smoothly therebetween. The screws 68 may then be tightened to fix the position of the saw guide assemblies in proper adjustment for the particular back saw. Once set up the saw guide assemblies need no further adjustment. The saw is always aligned with the extension arms 55, 56. The clamping engagement of screws 68 requires the saw guide assemblies to rotate on their pivot plugs 26, 44 as the angle of the extension arms 55, 56 with respect to the squaring fence 17 is changed. Accordingly, regardless of the position of the support bracket 41, the identical relation between the saw guide rollers and saw blade is maintained.

To move the saw to any angle the saw and guide roller carrier are desirably raised to the top of the guide rods 51, whereupon the spring clips 82 will engage the margins 81 of the hood 69 to hold the saw in an elevated position. The adjustable bracket 41 is then rectilinearly adjusted along the rail 37 as aforesaid. To permit this movement the screw 59, which clamps the extensible members 55, 56 together, must first be loosened. When the bracket 41 is properly positioned, screws 98 and 59 are then tightened.

The depth stops 83 are clamped by clamp screw 84 in position where the cutting edge 113 of the saw barely touches the cutting board 20. Accordingly, a workpiece positioned in the miter box may be cut through, but the saw will not cut substantially into the cutting board 20 as the depth of the cut is limited.

I claim:

1. In a device of the character described, an adjustable saw guide mounting comprising a rail, a support bracket adjustable along said rail, said rail having notches spaced therealong, said support bracket having a detent positioned for engagement with said notches and resilient means biasing said detent toward said engagement, and a pin manually operable to release the bias of said spring to remove the detent from engagement with the notch, said resilient means comprising a leaf spring having a portion fixed with respect to the bracket and a remote portion engaged with said detent, said release means comprising a stem engaged with the spring remote from its fixed portion whereby manipulation of said stem deforms the spring against its bias to release the detent.

2. In a miter box having front and rear saw blade guides respectively comprising spaced roller bearings between which the saw blade is guided, the improvement for supporting said roller bearings in adjustably fixed spaced apart relation and comprising sets of parallel rods on which said roller bearings are rotatably mounted, the respective upper and lower ends of said rod sets being provided with upper and lower end heads in which the rods are fixed, said miter box being provided with means forming front and rear sockets in which the said lower end heads are journaled for rotation on laterally spaced vertical axes, arm means cross connecting the upper end heads and provided with means on which said upper end heads are journaled for rotation on said axes, and means for clamping said upper end heads to said arm means whereby to releasably fix said end heads and the spaced rods connected thereto in fixed position with respect to said arm means.

3. The device of claim 2 in which said arm means is provided concentrically about each said vertical axes with curvilinear slots, said upper end heads being provided with screw apertures aligned with said slots, and screws receivable through said slots for releasably clamping said heads to said arm means.

4. The device of claim 2 in which said sets of parallel rods are provided with roller bearing carrier hoods axially slidable on said rods, said hoods having means confining said roller bearings axially therewithin for co-joint axial movement of said roller bearings with said hoods.

5. The device of claim 2 in which said means forming said front socket comprises a bracket slidable rectilinearly along the front margin of the miter box, said miter box being provided with a rectilinear slide rail for said bracket, said miter box being provided with a milled plane surface adjacent said rail, said bracket being provided with means for selectively biasing said bracket against said milled surface for stabilizing said bracket in adjusted position, said arm means comprising parts in extensible connection and having a lock which is releasable to permit arm extension in the course of bracket movement and to lock said arm in adjusted position.

6. The device of claim 5 in which said biasing means comprises a hook engaged about the rail and means for tensioning the hook thereagainst, said hook having a connection to the bracket reactive upon tensioning of the hook to pressure the bracket against the milled surface.

References Cited in the file of this patent

UNITED STATES PATENTS

| | | |
|---|---|---|
| 192,139 | Traut | June 19, 1877 |
| 346,240 | Soukup | July 27, 1886 |
| 490,514 | Spiker | Jan. 24, 1893 |
| 493,667 | Uhl | Mar. 21, 1893 |
| 766,796 | Richards | Aug. 2, 1904 |
| 766,797 | Richards | Aug. 2, 1904 |
| 766,798 | Richards | Aug. 2, 1904 |
| 851,841 | Schade | Apr. 30, 1907 |
| 1,026,086 | Fisk | May 14, 1912 |
| 1,184,732 | Fisk | May 30, 1916 |
| 1,417,973 | Cary | May 30, 1922 |
| 1,574,663 | Leske | Feb. 23, 1926 |